United States Patent
Hagen et al.

(10) Patent No.: US 11,262,010 B2
(45) Date of Patent: Mar. 1, 2022

(54) QUICK CONNECT WITH INDICATOR TAB

(71) Applicant: Oetiker NY, Inc., Lancaster, NY (US)

(72) Inventors: Kristian Hagen, Gasport, NY (US); Thomas Hall, Buffalo, NY (US)

(73) Assignee: Oetiker NY, Inc., Lancaster, NY (US)

( * ) Notice: Subject to any disclaimer, the term of this patent is extended or adjusted under 35 U.S.C. 154(b) by 236 days.

(21) Appl. No.: 16/631,972

(22) PCT Filed: Aug. 7, 2018

(86) PCT No.: PCT/US2018/045590
§ 371 (c)(1),
(2) Date: Jan. 17, 2020

(87) PCT Pub. No.: WO2019/036233
PCT Pub. Date: Feb. 21, 2019

(65) Prior Publication Data
US 2020/0166167 A1 May 28, 2020

Related U.S. Application Data

(60) Provisional application No. 62/545,123, filed on Aug. 14, 2017.

(51) Int. Cl.
*F16L 37/088* (2006.01)

(52) U.S. Cl.
CPC ....... *F16L 37/0885* (2019.08); *F16L 2201/10* (2013.01)

(58) Field of Classification Search
CPC ... F16L 37/084; F16L 37/088; F16L 37/0885; F16L 37/12; F16L 37/1225; F16L 37/14; F16L 37/148; F16L 2201/10

USPC ................................................... 285/93, 321
See application file for complete search history.

(56) References Cited

U.S. PATENT DOCUMENTS

| | | | |
|---|---|---|---|
| 5,979,946 A | 11/1999 | Petersen | |
| 6,129,393 A | 10/2000 | Kodama et al. | |
| 2004/0178629 A1 | 9/2004 | Naoki | |
| 2006/0082146 A1 | 4/2006 | Heim et al. | |
| 2008/0136163 A1* | 6/2008 | Okada | F16L 37/0987 285/2 |
| 2010/0276924 A1 | 11/2010 | Gillet et al. | |

(Continued)

FOREIGN PATENT DOCUMENTS

| | | |
|---|---|---|
| EP | 1762541 | 3/2007 |
| EP | 3054206 | 8/2016 |
| FR | 2891344 | 3/2007 |

(Continued)

*Primary Examiner* — Aaron M Dunwoody
(74) *Attorney, Agent, or Firm* — Simpson & Simpson, PLLC

(57) ABSTRACT

A quick connect connection assembly, including a quick connect, including a first end, a second end, a first radially outward facing surface, a first radially inward facing surface, a second radially inward facing surface, and at least one aperture extending from the first radially outward facing surface to the first radially inward facing surface, and an indicator tab operatively arranged to be removably secured to the quick connect, the indicator tab including at least one arm, wherein the at least one arm is arranged to extend through the at least one aperture and radially inward from the first radially inward facing surface.

20 Claims, 8 Drawing Sheets

(56) References Cited

U.S. PATENT DOCUMENTS

2012/0104746 A1  5/2012  Fansler et al.

FOREIGN PATENT DOCUMENTS

| WO | WO1994/27077 | 11/1994 |
|----|--------------|---------|
| WO | WO2007003770 | 1/2007  |

* cited by examiner

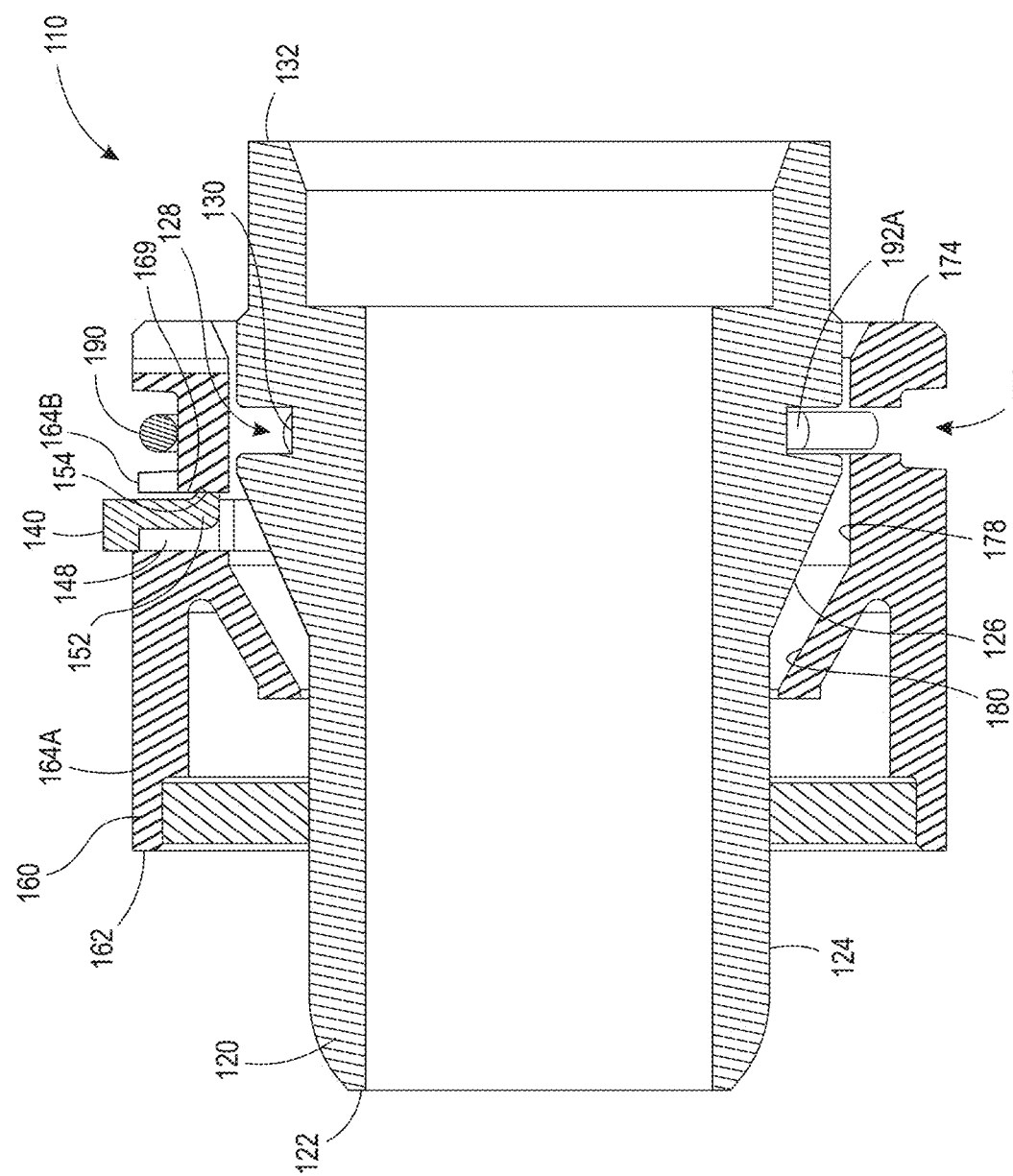

QUICK CONNECT WITH INDICATOR TAB

CROSS-REFERENCE TO RELATED APPLICATIONS

The present application is the United States National Stage Application pursuant to 35 U.S.C. § 371 of International Patent Application No. PCT/US2018/045590, filed on Aug. 7, 2018, which application claims priority to U.S. Provisional Patent Application No. 62/545,123, filed on Aug. 14, 2017, which applications are hereby incorporated by reference in their entireties.

FIELD

The present disclosure relates to a quick connect connection, and more particularly, to a quick connect connection assembly having an indicator to indicate that the connection is fully engaged.

BACKGROUND

A quick connect fitting, also called a quick disconnect or quick release coupling, is a coupling used to provide a fast, make-or-break connection of fluid transfer lines. Operated by hand, quick connect fittings replace threaded or flanged connections, which require wrenches. When equipped with self-sealing valves, quick connect fittings will, upon disconnection, automatically contain any fluid in the line. During mass production undertakings that utilize quick connect couplings, errors in the assembly process may result in quick connect couplings not being fully engaged or connected.

SUMMARY

According to aspects illustrated herein, there is provided a quick connect connection assembly, comprising a quick connect, including a first end, a second end, a first radially outward facing surface, a first radially inward facing surface, a second radially inward facing surface, and at least one aperture extending from the first radially outward facing surface to the first radially inward facing surface, and an indicator tab operatively arranged to be removably secured to the quick connect, the indicator tab comprising at least one arm, wherein the at least one arm is arranged to extend through the at least one aperture and radially inward from the first radially inward facing surface.

According to aspects illustrated herein, there is provided a quick connect connection assembly, comprising a quick connect, including a first end, a second end, a first radially outward facing surface, a first radially inward facing surface, a second radially inward facing surface, and at least one aperture extending from the first radially outward facing surface to the first radially inward facing surface, and an indicator tab operatively arranged to be removably secured to the quick connect, the indicator tab including an outer surface, and at least one tab having a tongue, wherein the at least one tab is arranged to extend through the at least one aperture and radially inward from the first radially inward facing surface.

One objective of the quick connect with indicator tab is to provide an indication method for ensuring the coupling is fully connected.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, and/or pneumatics.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

By "non-rotatably connected" elements, we mean that: the elements are connected so that whenever one of the elements rotate, all the elements rotate; and relative rotation between the elements is not possible. Radial and/or axial movement of non-rotatably connected elements with respect to each other is possible, but not required.

Figure 1:
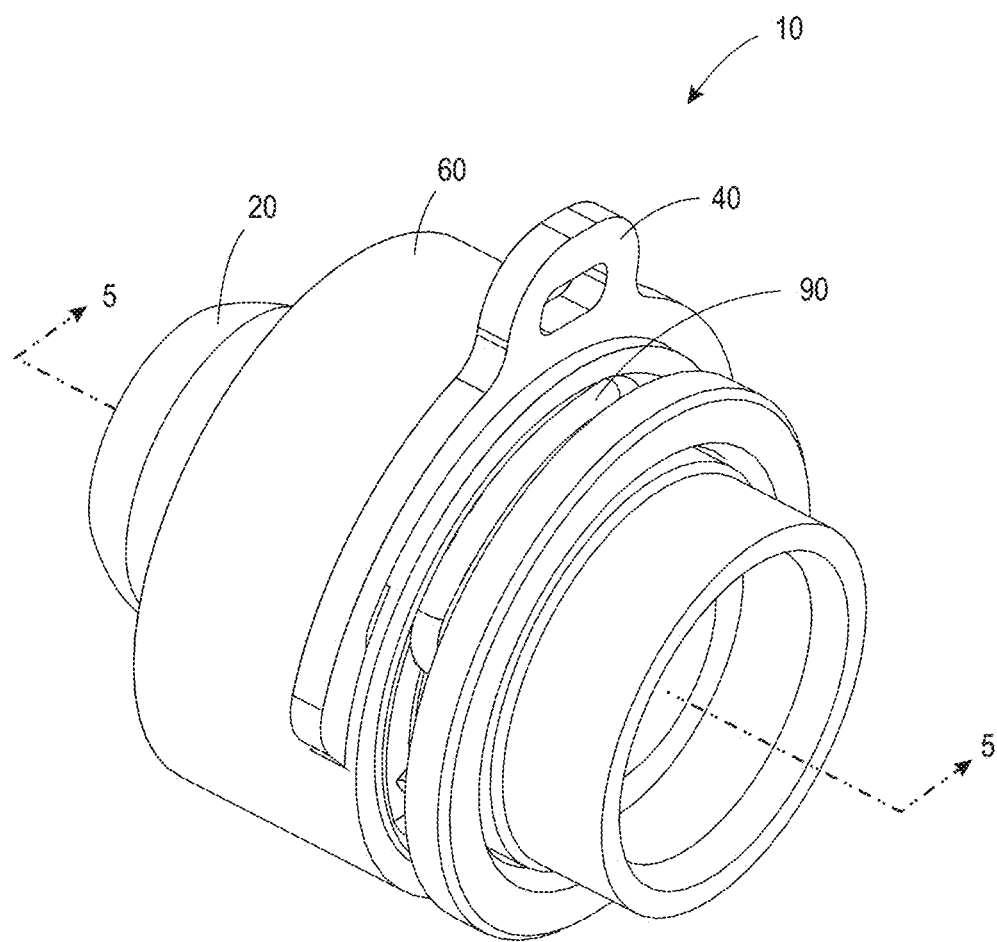
FIG. 1 is a perspective view of a connection assembly.
Figure 2:
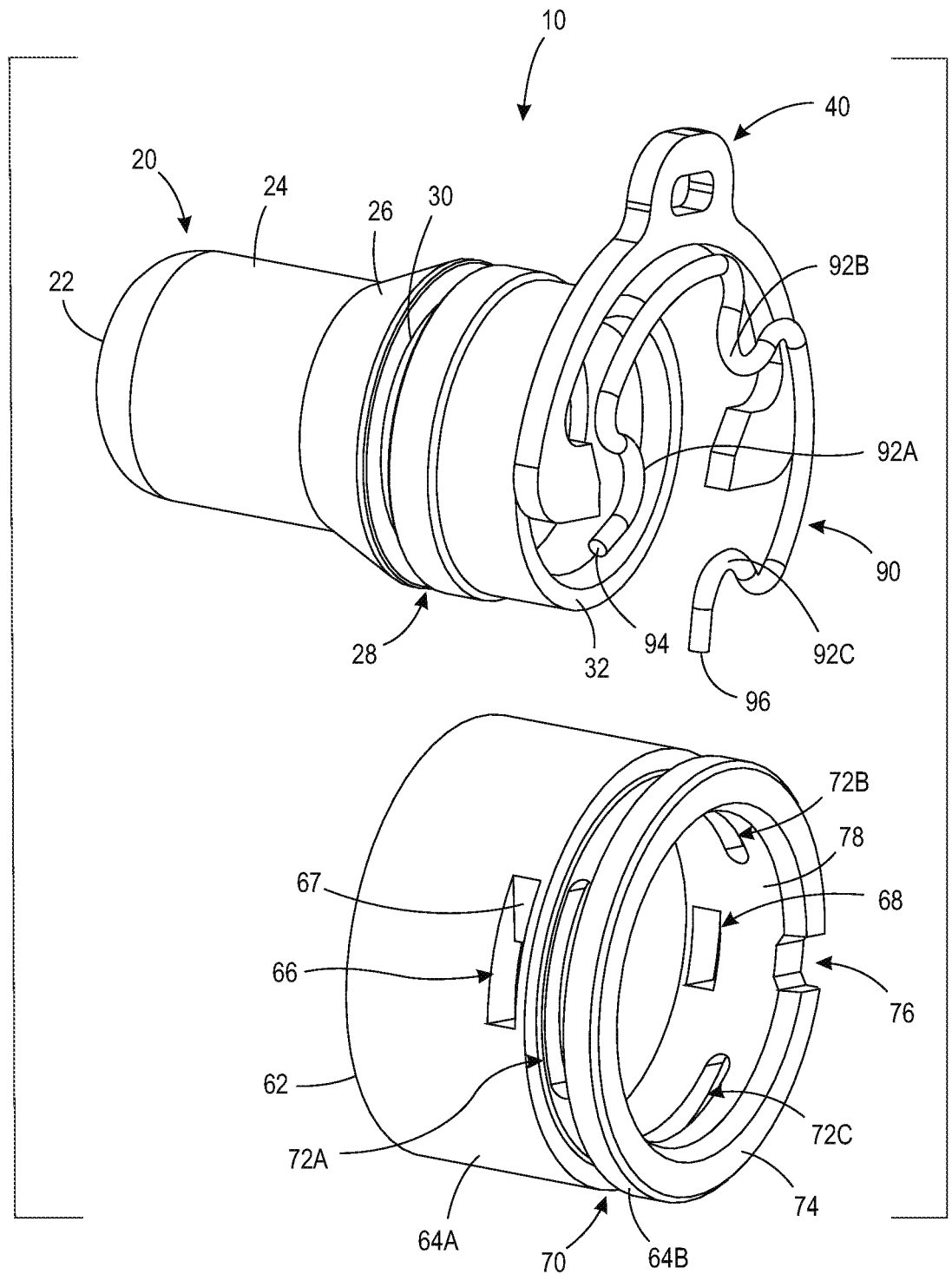
FIG. 2 is an exploded perspective view of the connection assembly shown in FIG. 1.

Adverting now to the figures, FIG. 1 is a perspective view of connection assembly 10. FIG. 2 is an exploded perspective view of connection assembly 10. Connection assembly 10 generally comprises tube end form 20, indicator tab 40, quick connect 60, and retaining clip 90.

Tube end form 20 is a generally a cylindrical tube comprising end 22, radially outward facing surface 24, radially outward facing surface 26, radially outward facing surface 30, and end 32. Radially outward facing surface 26 is frusto-conical and increases in diameter in the axial direction from end 22 toward end 32. Radially outward facing surfaces 24 and 30 are cylindrical and have constant diameters. In an example embodiment, radially outward facing surfaces 24 and 30 have variable diameters. Radially outward facing surface 30 may be arranged in channel 28. Tube end form 20 is arranged to be inserted into quick connect 60 with end 22 being first inserted into end 74, as will be discussed in greater detail below. Once tube end form 20 is fully inserted into quick connect 60, indicator tab 40 can be removed from quick connect 60. However, if tube end form 20 is not fully inserted into quick connect 60, indicator tab 40 cannot be removed from quick connect 60.

Retaining clip 90 comprises one or more protrusions arranged to engage apertures in quick connect 60 and lock tube end form 20 therein. In the embodiment shown, retaining clip 90 comprises end 94, end 96, and protrusions 92A-C. Retaining clip 90 comprises a material that is elastically deformable, for example, a wire clip, a retaining ring, or any other suitable clip.

Figure 3:
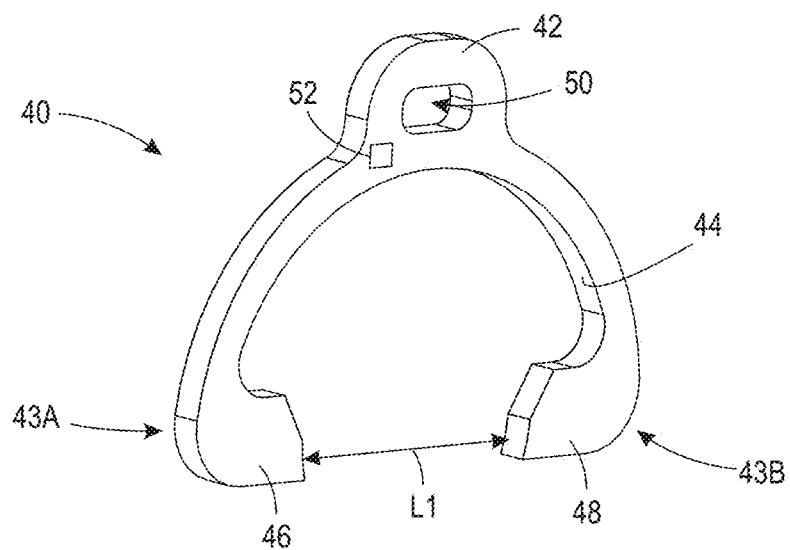
FIG. 3 is a perspective view of the indicator tab shown in FIG. 1.

FIG. 3 is a perspective view of indicator tab 40. Indicator tab 40 includes handle 42, arm 46, and arm 48. Handle 42 is generally curved and includes end 43A, end 43B, and radially inward facing surface 44. Arm 46 is arranged at end 43A and extends radially inward from radially inward facing surface 44. Arm 48 is arranged at end 43B and extends radially inward from radially inward facing surface 44. Arms 46 and 48 are arranged to engage apertures 66 and 68 of quick connect 60, as will be discussed in greater detail below. In an example embodiment, handle 42 is C-shaped; however, it should be appreciated that handle 42 can be any shape suitable for engaging quick connect 60, such as partial-rectangular, partial-square, v-shaped, U-shaped, partial-elliptical, etc. Handle 42 may further comprise aperture 50. Indicator tab 40 comprises a material that is elastically deformable. In the original un-deformed state, arms 46 and 48 are separated by distance L1. Handle 42 is capable of elastically deforming such that arms 46 and 48 are separated by distance L2 (not shown), which is greater than distance L1. In an example embodiment, indicator tab 40 further comprises radio-frequency identification (RFID) tag 52 such that indicator tab 40 can be automatically identified and tracked. Indicator tab 40 can only be removed from quick connect 60 once tube end form 20 is fully inserted into quick connect 60, thereby ensuring a fully engaged connection (discussed in greater detail below). Thus, it would be beneficial to be able to scan a connection assembly to determine whether indicator tab 40 is still connected to quick connect 60. It would also be beneficial to be able to scan an indicator tab discard receptacle to determine whether indicator tab 40 has been removed and properly discarded. It should be appreciated, however, that indicator tab 40 may comprise any tracking device suitable for determining whether indicator tab 40 has been removed from quick connect 60.

Figure 4:
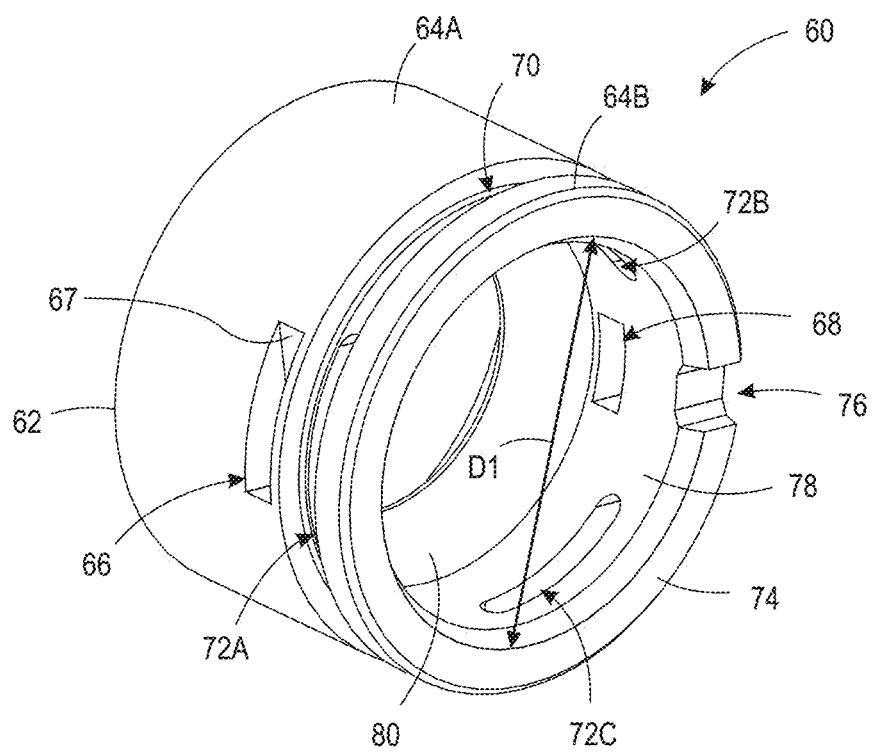
FIG. 4 is a perspective view of the quick connect shown in FIG. 1.

FIG. 4 is a perspective view of quick connect 60. Quick connect 60 is generally a cylindrical tube comprising end 62, radially outward facing surface 64A, radially outward facing surface 64B, groove 70, end 74, radially inward facing surface 78, and radially inward facing surface 80. Radially outward facing surface 64A comprises apertures 66 and 68. Aperture 66 comprises surface 67 and aperture 68 comprises surface 69 (not shown). In some embodiments, apertures 66 and 68 are substantially similar and diametrically opposed. Arms 46 and 48 are operatively arranged engage apertures 66 and 68 and connect indicator tab 40 to quick connect 60. When assembling indicator tab 40 to quick connect 60, ends 43A and 43B are spread apart (i.e., elastically deforming handle 42) and arms 46 and 48 are arranged on surfaces 67 and 69, respectively, with radially inward facing surface 44 arranged toward radially outward facing surface 64A. Handle 42 is then forced radially inward (i.e., toward radially outward facing surface 64A) until arms 46 and 48 snap into apertures 66 and 68, respectively. It should be appreciated that arms 46 and 48 can be snapped into apertures 68 and 66, respectively, simply by rotating indicator tab 40 180 degrees. When arms 46 and 48 snap into place, stress is removed from ends 43A and 43B and indicator tab 40 returns to its original un-deformed shape, with arms 46 and 48 being spaced apart by distance L1. It should be appreciated that radially outward facing surface 64A may comprise any number of apertures suitable to removably connect indicator tab 40 thereto. For example, radially outward facing surface 64A may comprise one or more apertures. Groove 70 is axially arranged between radially outward facing surfaces 64A and 64B, and comprises one or more apertures, for example, apertures 72A-C. Retaining clip 90 is operatively arranged in groove 70 such that protrusions 92A, 92B, and 92C engage apertures 72A, 72B, and 72C, respectively. It should be appreciated that specific protrusions of retaining clip 90 need not be assigned to specific protrusions of quick connect 60. For example, protrusions 92A, 92B, and 92C may be arranged to engage apertures 72C, 72B, and 72A, respectively, or any other suitable combination. Radially inward facing surface 80 is frusto-conical and increases in diameter in the axial direction from end 62 toward end 74. Radially inward facing surface 78 is cylindrical and has constant diameter D1. In an example embodiment, radially inward facing surface 78 has a variable diameter. Radially outward facing surface 64B may further comprise cutout 76, which extends axially from end 74 toward end 62.

When indicator tab 40 is assembled to quick connect 60, arms 46 and 48 extend through apertures 66 and 68, respectively. Indicator tab 40 is deformed such that arms 46 and 48 are separated by distance L2 (not shown), which is greater than distance L1. Distance L2 may be, for example, the linear distance between surface 67 and 69 (not shown). Arms 46 and 48 snap into place and protrude radially inward from radially inward facing surface 78, that is, distance L1 is less than diameter D1. As tube end form 20 is inserted into quick connect 60, radially outward facing surface 26 engages arms 46 and 48 and deforms indicator tab 40 such that the distance between arms 46 and 48 increases. When tube end form 20 is fully inserted into quick connect 60, the arms 46 and 48 are separated by distance L2 (not shown), which allows indicator tab 40 to be removed from quick connect 60. Indicator tab 40 is not capable of being removed from quick connect 60 unless and until tube end form 20 is fully engaged with quick connect 60.

Figure 5:
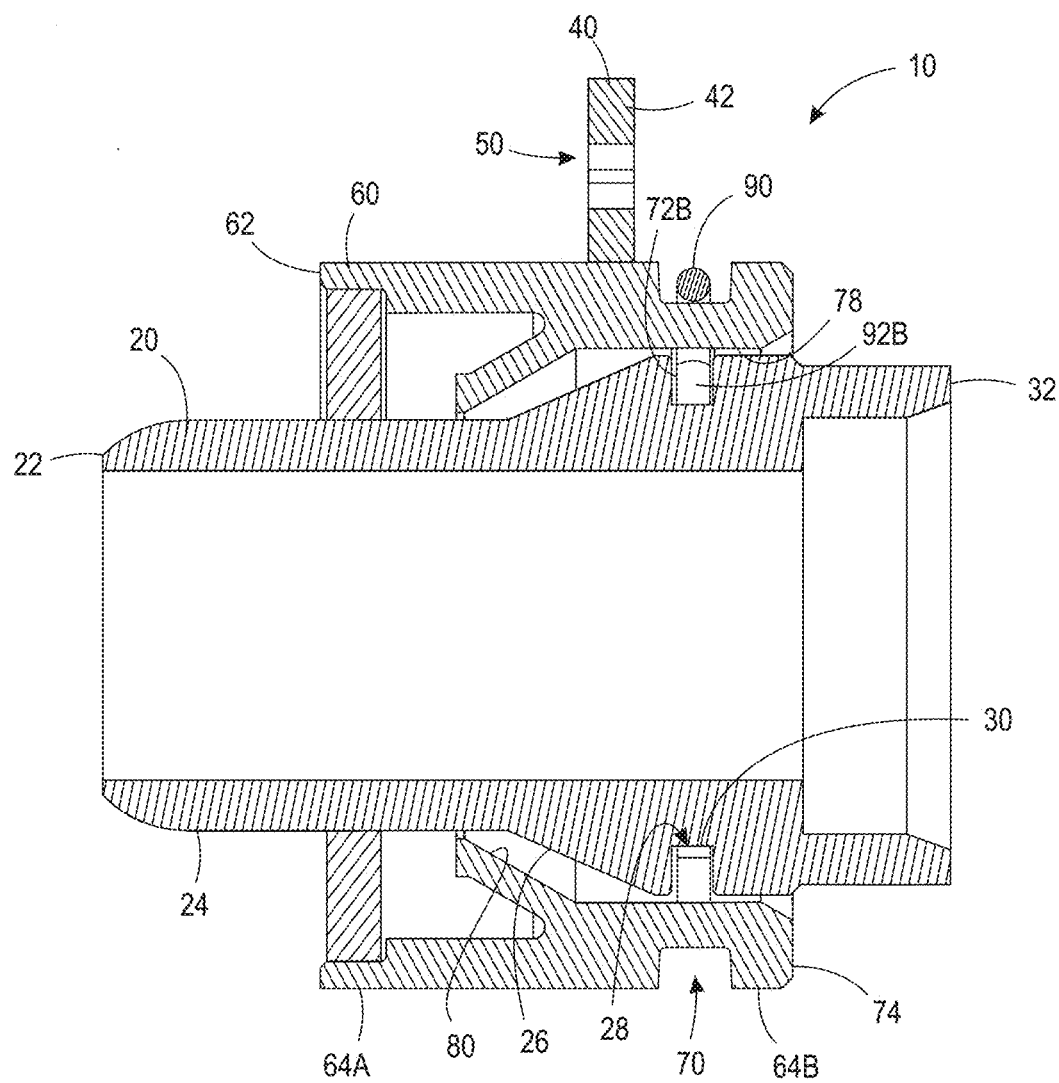
FIG. 5 is cross-sectional view of the connection assembly shown in FIG. 1 taken generally along line 5-5.

FIG. 5 is cross-sectional view of connection assembly 10 taken generally along line 5-5 in FIG. 1. As shown, when tube end form 20 is inserted into quick connect 60, retaining clip 90 snaps into channel 28 thereby locking tube end form 20 within quick connect 60. Additionally, when tube end form 20 is fully engaged with quick connect 60, radially outward facing surface 26 abuts against, or is arranged proximate to, radially inward facing surface 80.

Figure 6:
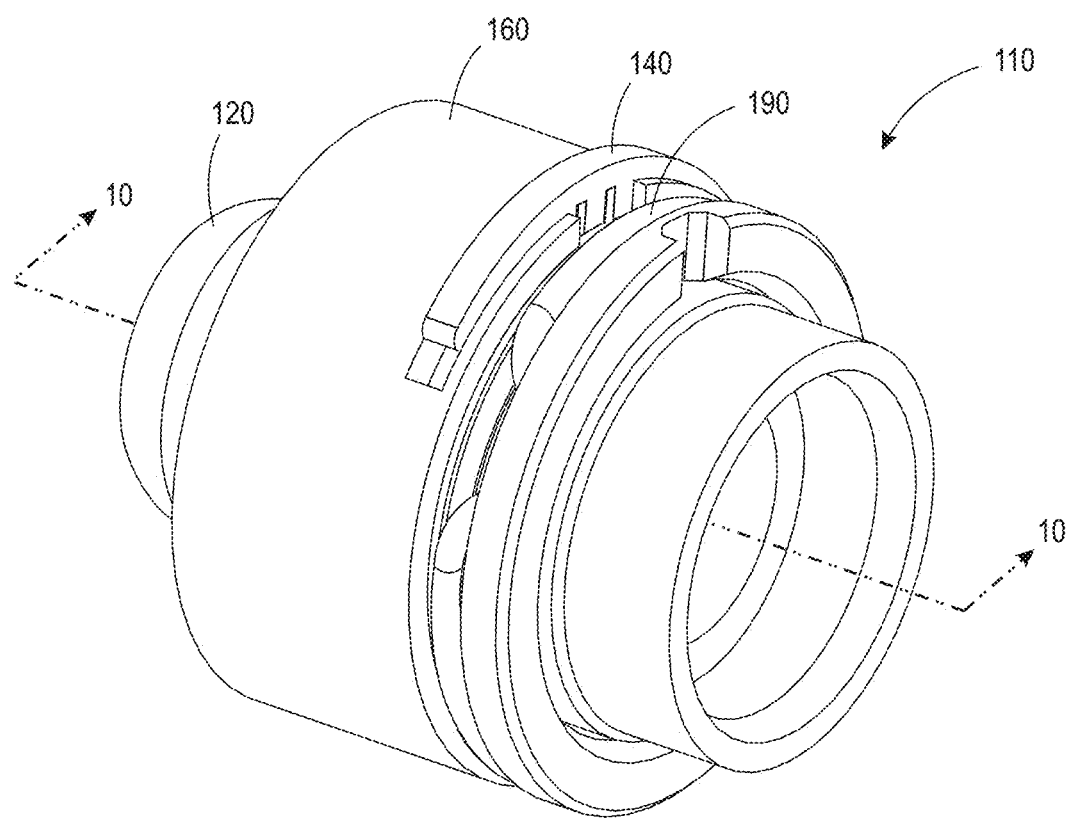
FIG. 6 is a perspective view of a connection assembly.
Figure 7:
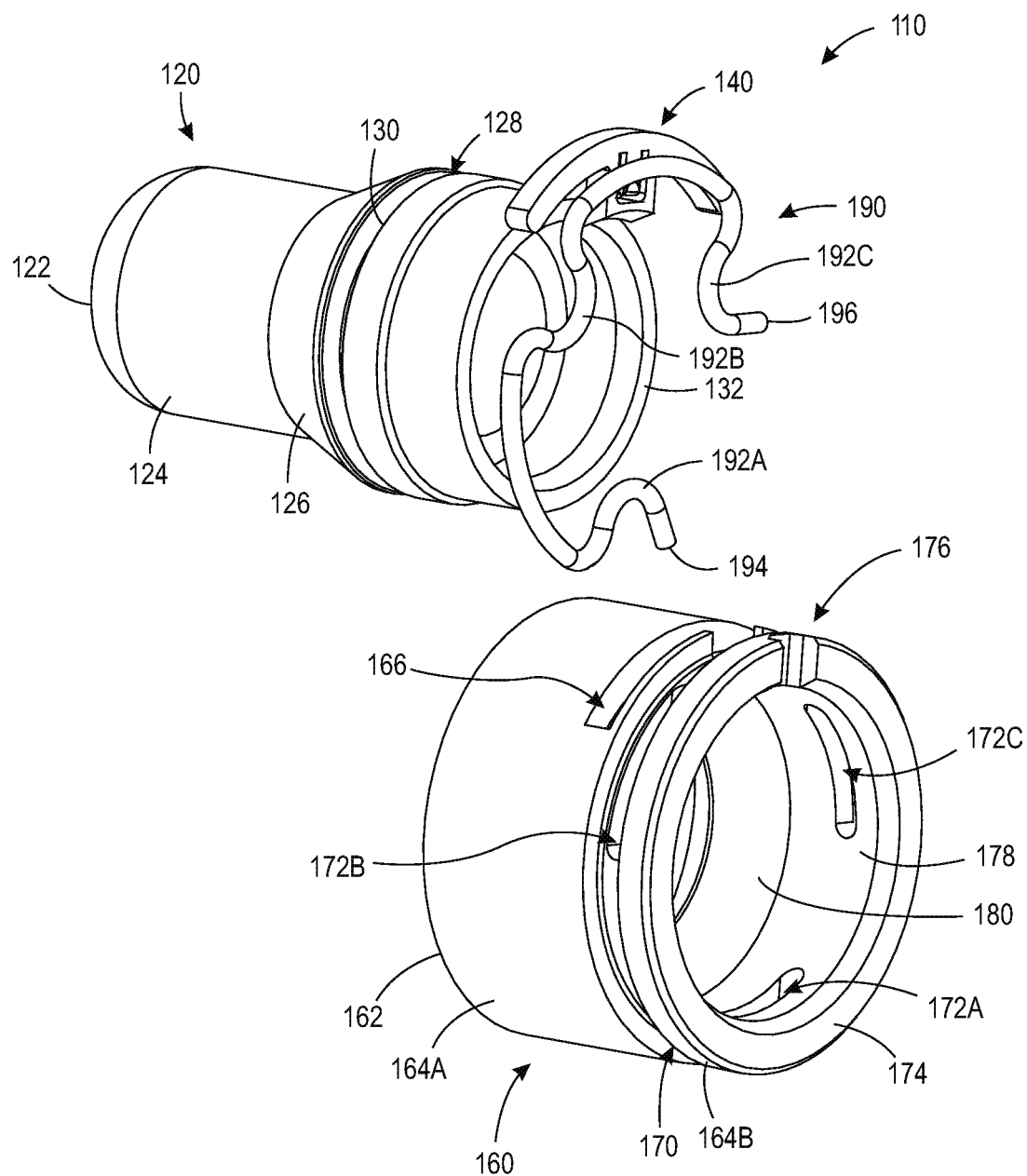
FIG. 7 is an exploded perspective view of the connection assembly shown in FIG. 6.

FIG. 6 is a perspective view of connection assembly 110. FIG. 7 is an exploded perspective view of connection assembly 110. Connection assembly 110 generally comprises tube end form 120, indicator tab 140, quick connect 160, and retaining clip 190.

Tube end form 120 is a generally a cylindrical tube comprising end 122, radially outward facing surface 124, radially outward facing surface 126, radially outward facing surface 130, and end 132. Radially outward facing surface 126 is frusto-conical and increases in diameter in the axial direction from end 122 toward end 132. Radially outward facing surfaces 124 and 130 are cylindrical and have constant diameters. In an example embodiment, radially outward facing surfaces 124 and 130 have variable diameters. Radially outward facing surface 130 may be arranged in channel 128. Tube end form 120 is arranged to be inserted into quick connect 160 with end 122 being first inserted into end 174, as will be discussed in greater detail below. Once tube end form 120 is fully inserted into quick connect 160, indicator tab 140 can be removed from quick connect 160. However, if tube end form 120 is not fully inserted into quick connect 160, indicator tab 140 cannot be removed from quick connect 160.

Retaining clip 190 comprises one or more protrusions arranged to engage apertures in quick connect 160 and lock tube end form 120 therein. In the embodiment shown, retaining clip 190 comprises end 194, end 196, and protrusions 192A-C. Retaining clip 190 comprises a material that is elastically deformable, for example, a wire clip, a retaining ring, or any other suitable clip.

Figure 8:
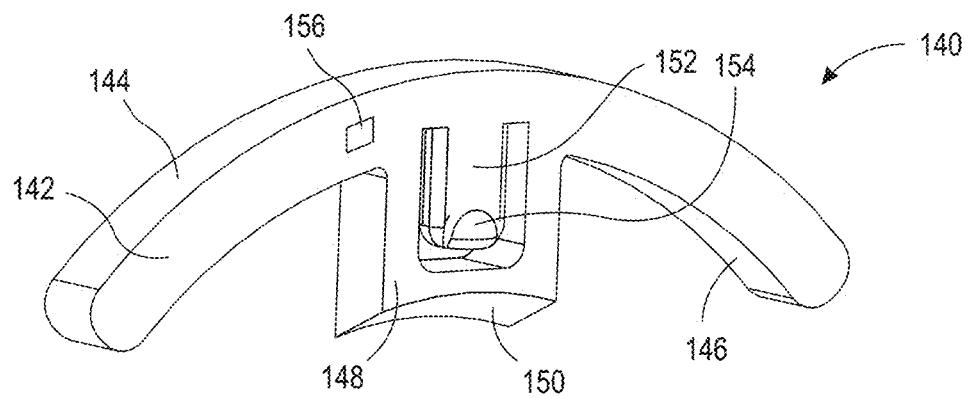
FIG. 8 is a perspective view of the indicator tab shown in FIG. 6.

FIG. 8 is a perspective view of indicator tab 140. Indicator tab 40 includes anchor 142, radially outward facing surface 144, radially inward facing surface 146, and tab 148. Tab 148 extends radially inward from radially inward facing surface 146 and comprises radially inward facing surface 150, which is at least partially frusto-conical. In an example embodiment, radially inward facing surface 150 is an angled planar surface. In an example embodiment, radially inward facing surface 150 is a planar surface. In some embodiments, radially inward facing surface 150 is a curvilinear surface. Indicator tab 140 is designed to be inserted into slot 166 of quick connect 160 as will be discussed in greater detail below. In an example embodiment, anchor 142 is curvilinear or C-shaped; however, it should be appreciated that handle 42 can be any shape suitable for engaging quick connect 60. Tab 148 may further comprise tongue 152 with protrusion 154 extending therefrom. In an example embodiment, indicator tab 140 further comprises radio-frequency identification (RFID) tag 156 such that indicator tab 140 can be automatically identified and tracked. Indicator tab 140 can only be removed from quick connect 160 once tube end form 120 is fully inserted into quick connect 160, thereby ensuring a fully engaged connection, as is discussed in greater detail below. Thus, it would be beneficial to be able to scan a connection assembly to determine whether indicator tab 140 is still connected to quick connect 160. It would also be beneficial to be able to scan an indicator tab discard receptacle to determine whether indicator tab 140 has been removed from quick connect 160 and properly discarded. It should be appreciated, however, that indicator tab 140 may comprise any tracking device suitable for determining whether indicator tab 140 has been removed from quick connect 160.

Figure 9:
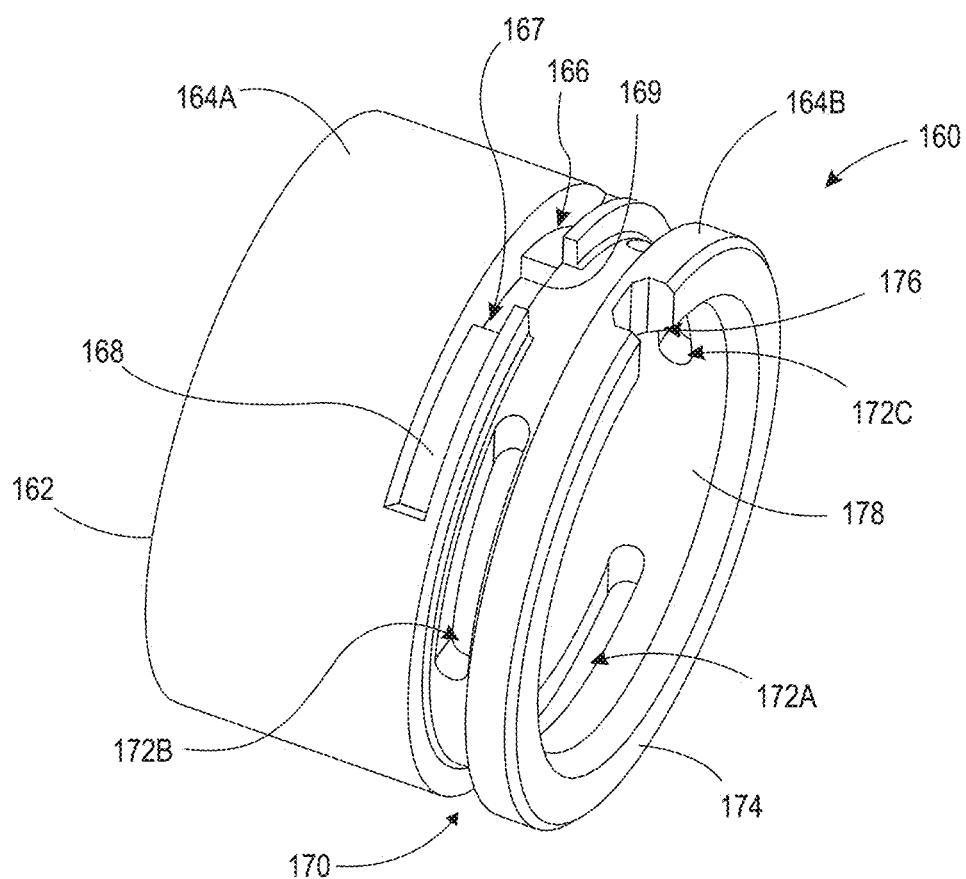
FIG. 9 is a perspective view of the quick connect shown in FIG. 6; and,
FIG. 10 is a cross-sectional view of the connection assembly shown in FIG. 6 taken generally along line 10-10.

FIG. 9 is a perspective view of quick connect 160. Quick connect 160 is generally a cylindrical tube comprising end 162, radially outward facing surface 164A, radially outward facing surface 164B, groove 170, end 174, radially inward facing surface 178, and radially inward facing surface 180 (shown in FIGS. 7 and 10). Radially outward facing surface 164A comprises slot 166 and aperture 167. Slot 166 comprises radially outward facing surface 168. Anchor 142 is operatively arranged to engage slot 166 and tab 148 is operatively arranged engage aperture 167, thereby connecting indicator tab 140 to quick connect 160. It should be appreciated that radially outward facing surface 164A may comprise any number of slots and/or apertures suitable to removably connect indicator tab 160 to quick connect 160. For example, radially outward facing surface 164A may comprise one or more slots and/or one or more apertures. Groove 170 is axially arranged between radially outward facing surfaces 164A and 164B, and comprises one or more apertures, for example, apertures 172A-C. Retaining clip 190 is operatively arranged in groove 170 such that protrusions 192A, 192B, and 192C engage apertures 172A, 172B, and 172C, respectively. It should be appreciated that specific protrusions of retaining clip 190 need not be assigned to specific protrusions of quick connect 160. For example, protrusions 192A, 192B, and 192C may be arranged to engage apertures 172C, 172B, and 172A, respectively, or any other suitable combination. Radially inward facing surface 180 is frusto-conical and increases in diameter in the axial direction from end 162 toward end 174. Radially inward facing surface 178 is cylindrical and has constant diameter D1. In an example embodiment, radially inward facing surface 178 has a variable diameter. Radially outward facing surface 164B may further comprise cutout 176, which extends axially from end 174 toward end 162.

When indicator tab 140 is assembled to quick connect 160, tab 148 extends through aperture 167, such that the diameter of radially inward facing surface 150 increases from end 162 toward end 174. As indicator tab 140 is inserted into slot 166, protrusion 154 interferes with axial surface 169 and tongue 152 is deformed. When indicator tab 140 is fully inserted in slot 166, tongue 152 snaps back into place as protrusion 154 clears axial surface 169 (i.e., tab 148 extends radially inward from radially inward facing surface 178) and radially outward facing surface 144 is flush with radially outward facing surface 164A. In an example embodiment, radially outward facing surface 144 is not flush with radially outward facing surface 164A when indicator tab 140 is fully inserted into slot 166. As tube end form 120 is inserted into quick connect 160, radially outward facing surface 126 engages radially inward facing surface 150 of tab 148, thus forcing indicator tab 140 radially outward. Tongue 152 is again deformed as protrusion 154 interferes with axial surface 169. When tube end form 120 is fully inserted into quick connect 160, radially outward facing surface 144 extends radially outward from radially outward facing surface 164A, thus indicating that tube end form 120 is fully engaged with quick connect 160. Indicator tab 140 is not capable of protruding from radially outward facing surface 164A unless and until tube end form 120 is fully engaged with quick connect 160. In an example embodiment, when tube end form 120 is fully inserted into quick connect 160, protrusion 154 and tongue 152 are arranged to force indicator tab 140 completely out of slot 166 (i.e., eject indicator tab 140 from quick connect 160), thus indicating that tube end form 120 is fully engaged with quick connect 160. Indicator tab 140 is not capable of being ejected from quick connect 160 unless and until tube end form 120 is fully engaged with quick connect 160.

FIG. 10 is a cross-sectional view of connection assembly 110 taken generally along line 10-10 in FIG. 6. As shown, when tube end form 120 is inserted into quick connect 160, retaining clip 190 snaps into channel 128 thereby locking tube end form 120 within quick connect 160. Additionally, when tube end form 120 is fully engaged with quick connect 160, radially outward facing surface 126 abuts against, or is arranged proximate to, radially inward facing surface 180.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

10 Connection assembly
20 Tube end form
22 End
24 Radially outward facing surface
26 Radially outward facing surface
28 Channel
30 Radially outward facing surface
32 End
40 Indicator tab
42 Handle
43A End
43B End
44 Radially inward facing surface
46 Arm
48 Arm
50 Aperture
52 Radio-frequency identification (RFID)
60 Quick connect
62 End
64A Radially outward facing surface
64B Radially outward facing surface
66 Aperture
67 Surface
68 Aperture
69 Surface (not shown)
70 Groove
72A Aperture
72B Aperture
72C Aperture
74 End
76 Cutout
78 Radially inward facing surface
80 Radially inward facing surface
90 Retaining clip
92A Protrusion
92B Protrusion
92C Protrusion
94 End
96 End
110 Connection assembly
120 Tube end form
122 End
124 Radially outward facing surface
126 Radially outward facing surface
128 Channel
130 Radially outward facing surface
132 End
140 Indicator tab
142 Anchor
144 Radially outward facing surface
146 Radially inward facing surface
148 Tab
150 Radially inward facing surface
152 Tongue
154 Protrusion
156 Radio-frequency identification (RFID)
160 Quick connect
162 End
164A Radially outward facing surface
164B Radially outward facing surface
166 Slot
167 Aperture
168 Radially outward facing surface
169 Axial surface
170 Groove
172A Aperture
172B Aperture
172C Aperture
174 End
176 Cutout
178 Radially inward facing surface
180 Radially inward facing surface
190 Retaining clip
192A Protrusion
192B Protrusion
192C Protrusion
194 End
196 End
L1 Distance
L2 Distance (not shown)
D1 Diameter

What is claimed is:

1. A quick connect connection assembly, comprising:
a quick connect, including:
a first end;
a second end;
a first radially outward facing surface comprising a first circumferential groove and one or more apertures arranged circumferentially in the first circumferential groove;
a first radially inward facing surface;
a second radially inward facing surface; and,
at least one aperture extending from the first radially outward facing surface to the first radially inward facing surface;
a retaining clip arranged in the first circumferential groove and including one or more protrusions, wherein each of the one or more protrusions engage each of the one or more apertures; and,
an indicator tab operatively arranged to be removably secured to the quick connect, the indicator tab comprising at least one arm, wherein the at least one arm is arranged to extend through the at least one aperture and radially inward from the first radially inward facing surface.

2. The quick connect connection assembly as recited in claim 1, further comprising a tube end form arranged to be connected the quick connect, the tube end form comprising:
a third end;
a fourth end;
a second radially outward facing surface;
a third radially outward facing surface; and,
a second circumferential groove arranged on the second radially outward facing surface.

3. The quick connect connection assembly as recited in claim 2, wherein each of the one or more protrusions extend through each of the one or more apertures and engage the second circumferential groove.

4. The quick connect connection assembly as recited in claim 3, wherein in a non-fully connected state the indicator tab is not removable from the quick connect.

5. The quick connect connection assembly as recited in claim 3, wherein in a fully connected state:
   the third end of the tube end form is inserted into the second end of the quick connect until the third radially outward facing surface is arranged proximate the second radially inward facing surface;
   the third radially outward facing surface engages the at least one arm; and,
   the indicator tab is removable from the quick connect.

6. The quick connect connection assembly as recited in claim 1, wherein the indicator tab comprises two arms and the quick connect comprises two apertures.

7. The quick connect connection assembly as recited in claim 1, wherein the second radially inward facing surface is frusto-conical.

8. The quick connect connection assembly as recited in claim 1, wherein the first radially outward facing surface is frusto-conical.

9. The quick connect connection assembly as recited in claim 1, wherein the indicator tab further comprises a radio-frequency indication (RFID) tag.

10. A quick connect connection assembly, comprising:
   a quick connect, including:
      a first end;
      a second end;
      a first radially outward facing surface;
      a first radially inward facing surface;
      a second radially inward facing surface; and,
      at least one aperture extending from the first radially outward facing surface to the first radially inward facing surface; and,
   an indicator tab operatively arranged to be removably secured to the quick connect, the indicator tab including:
      an outer surface; and,
      at least one tab comprising a tongue, wherein the at least one tab is arranged to extend through the at least one aperture and radially inward from the first radially inward facing surface;
   wherein:
      in a fully connected state of the quick connection assembly, the outer surface protrudes from the first radially outward facing surface; and,
      in a non-fully connected state of the quick connect connection, the outer surface is flush with the first radially outward facing surface.

11. The quick connect connection assembly as recited in claim 10, wherein the first radially outward facing surface comprises:
   a first circumferential groove; and,
   one or more apertures arranged circumferentially in the first circumferential groove.

12. The quick connect connection assembly as recited in claim 11, further comprising a retaining clip arranged in the first circumferential groove and including one or more protrusions, wherein each of the one or more protrusions engage each of the one or more apertures.

13. The quick connect connection assembly as recited in claim 12, further comprising a tube end form arranged to be connected the quick connect, the tube end form comprising:
   a third end;
   a fourth end;
   a second radially outward facing surface;
   a third radially outward facing surface; and,
   a second circumferential groove arranged on the second radially outward facing surface.

14. The quick connect connection assembly as recited in claim 13, wherein each of the one or more protrusions extend through each of the one or more apertures and engage the second circumferential groove.

15. The quick connect connection assembly as recited in claim 14, wherein in the fully connected state:
   the third end of the tube end form is inserted into the second end of the quick connect until the third radially outward facing surface is arranged proximate the second radially inward facing surface; and,
   the third radially outward facing surface engages the at least one tab.

16. The quick connect connection assembly as recited in claim 14, wherein in the fully connected state the indicator tab is at least partially ejected from the quick connect.

17. The quick connect connection assembly as recited in claim 13, wherein the second radially outward facing surface is frusto-conical.

18. The quick connect connection assembly as recited in claim 13, wherein the indicator tab further comprises a radio frequency identification (RFID) tag.

19. The quick connect connection assembly as recited in claim 13, wherein the tongue is completely enclosed within and displaceable with respect to the at least one tab.

20. A quick connect connection assembly, comprising:
   a quick connect, including:
      a first end;
      a second end;
      a first radially outward facing surface;
      a first radially inward facing surface;
      a second radially inward facing surface; and,
      at least one aperture extending from the first radially outward facing surface to the first radially inward facing surface; and,
   an indicator tab operatively arranged to be removably secured to the quick connect, the indicator tab including:
      a first section forming an outermost surface and a third radially inward facing surface; and,
      a tab extending from the third radially inward facing surface and comprising a tongue, wherein the tab is arranged to extend through the at least one aperture and radially inward from the first radially inward facing surface;
   wherein in a non-fully connected state of the quick connection, the outermost surface does not protrude from the first radially outward facing surface.

* * * * *